United States Patent
De Rybel et al.

(10) Patent No.: US 12,545,015 B2
(45) Date of Patent: *Feb. 10, 2026

(54) BARRIER PAPER PACKAGING FILM

(71) Applicant: AMCOR FLEXIBLES NORTH AMERICA, INC., Neenah, WI (US)

(72) Inventors: Nils De Rybel, Destelbergen (BE); Peter Ettridge, Worcester (GB); Pieter Cools, Aalter (BE); Steven Birch, Worcester (GB); Paul Stewart, Grange-over-Sands (GB)

(73) Assignee: AMCOR FLEXIBLES NORTH AMERICA, INC., Neenah, WI (US)

( * ) Notice: Subject to any disclaimer, the term of this patent is extended or adjusted under 35 U.S.C. 154(b) by 75 days.

This patent is subject to a terminal disclaimer.

(21) Appl. No.: 18/273,019

(22) PCT Filed: Jan. 31, 2022

(86) PCT No.: PCT/US2022/014579
§ 371 (c)(1),
(2) Date: Jul. 18, 2023

(87) PCT Pub. No.: WO2022/165346
PCT Pub. Date: Aug. 4, 2022

(65) Prior Publication Data
US 2024/0083150 A1 Mar. 14, 2024

Related U.S. Application Data

(60) Provisional application No. 63/144,303, filed on Feb. 1, 2021.

(51) Int. Cl.
*B32B 27/10* (2006.01)
*B32B 7/12* (2006.01)
(Continued)

(52) U.S. Cl.
CPC .............. *B32B 27/10* (2013.01); *B32B 7/12* (2013.01); *B32B 27/08* (2013.01); *B32B 27/12* (2013.01);
(Continued)

(58) Field of Classification Search
None
See application file for complete search history.

(56) References Cited

U.S. PATENT DOCUMENTS 2,610,939 A 9/1952 Fisher
4,561,920 A 12/1985 Foster
(Continued)

FOREIGN PATENT DOCUMENTS

CN 102909924 A 2/2013
CN 109955555 A 7/2019
(Continued)

OTHER PUBLICATIONS

Machine translation of JP 2011-006073 A (Year: 2011).*
(Continued)

*Primary Examiner* — Ramsey Zacharia

(57) ABSTRACT

A paper-based packaging film comprising a fiber-based component, a polymeric film comprising a thickness from 2 micron and 8 micron, the polymeric film coated with a barrier material comprising a metal, a metal oxide or an inorganic oxide, a layer comprising a heat sealable polymer, and an adhesive layer located between the fiber-based component and the barrier material. The polymeric film is one of oriented polyester film, oriented polylactic acid film, polyester, polylactic acid, ethylene vinyl alcohol copolymer and polyvinyl alcohol copolymer, and the total composition of the paper-based packaging film includes a fiber content greater than 80%, by weight.

10 Claims, 2 Drawing Sheets

(51) Int. Cl.
- *B32B 27/08* (2006.01)
- *B32B 27/12* (2006.01)
- *B32B 27/30* (2006.01)
- *B32B 27/32* (2006.01)
- *B32B 27/36* (2006.01)
- *B32B 29/00* (2006.01)
- *B32B 33/00* (2006.01)
- *B65D 75/00* (2006.01)
- *B65D 75/12* (2006.01)
- *B65D 65/40* (2006.01)

(52) U.S. Cl.
CPC ............ *B32B 27/306* (2013.01); *B32B 27/32* (2013.01); *B32B 27/36* (2013.01); *B32B 29/002* (2013.01); *B32B 33/00* (2013.01); *B65D 75/008* (2013.01); *B65D 75/12* (2013.01); *B32B 2250/03* (2013.01); *B32B 2255/10* (2013.01); *B32B 2255/20* (2013.01); *B32B 2255/205* (2013.01); *B32B 2255/24* (2013.01); *B32B 2255/28* (2013.01); *B32B 2305/70* (2013.01); *B32B 2307/31* (2013.01); *B32B 2307/718* (2013.01); *B32B 2307/7244* (2013.01); *B32B 2307/7246* (2013.01); *B32B 2307/7376* (2023.05); *B32B 2553/00* (2013.01); *B65D 65/40* (2013.01)

(56) References Cited

U.S. PATENT DOCUMENTS

| | | | |
|---|---|---|---|
| 5,332,586 | A | 7/1994 | Di Mino |
| 5,506,036 | A * | 4/1996 | Bergerioux ............. B32B 27/10 428/483 |
| 5,529,834 | A | 6/1996 | Tsai et al. |
| 6,846,573 | B2 | 1/2005 | Seydel |
| 7,732,057 | B2 | 6/2010 | Stokes et al. |
| 8,771,835 | B2 | 7/2014 | Iyengar et al. |
| 9,637,866 | B2 | 5/2017 | Tilton |
| 9,688,442 | B2 | 6/2017 | Lyzenga et al. |
| 10,994,525 | B2 | 5/2021 | Öhman et al. |
| 2007/0116910 | A1 | 5/2007 | Polykarpov et al. |
| 2007/0259139 | A1 | 11/2007 | Furneaux |
| 2008/0254266 | A1 * | 10/2008 | Hachisuka ............. B32B 27/10 428/200 |
| 2014/0227495 | A1 | 8/2014 | Rothenbuehler |
| 2016/0176601 | A1 | 6/2016 | Boekeloo et al. |
| 2018/0072032 | A1 | 3/2018 | Huang et al. |
| 2018/0149988 | A1 | 5/2018 | Kawaguchi et al. |
| 2022/0073231 | A1 * | 3/2022 | Lim ..................... B65D 65/466 |
| 2022/0135308 | A1 † | 5/2022 | Wetsch |
| 2023/0114239 | A1 † | 4/2023 | Grefenstein |
| 2024/0308192 | A1 | 9/2024 | De Rybel et al. |

FOREIGN PATENT DOCUMENTS

| | | |
|---|---|---|
| CN | 11165547 A | 9/2020 |
| DE | 102013213478 A1 | 1/2015 |
| DE | 102017201449 A1 | 8/2018 |
| EP | 0036655 A | 9/1981 |
| EP | 0774501 A | 5/1997 |
| EP | 1176005 B1 | 10/2005 |
| EP | 2209720 B1 | 11/2012 |
| EP | 2718102 A1 | 4/2014 |
| EP | 2758239 A1 | 7/2014 |
| EP | 2821351 A1 | 1/2015 |
| EP | 3317095 A1 | 5/2018 |
| EP | 3122826 B1 | 4/2019 |
| EP | 3517291 A1 | 7/2019 |
| EP | 3560696 A1 | 10/2019 |
| EP | 3594406 A1 | 1/2020 |
| EP | 3647219 A1 | 5/2020 |
| IT | 201900004121 A1 | 9/2020 |
| JP | H10218170 A | 8/1998 |
| JP | 2005096779 A | 4/2005 |
| JP | 2011006073 A * | 1/2011 |
| JP | 06673126 B2 | 3/2020 |
| JP | 2020142528 A | 9/2020 |
| WO | 9716312 A1 | 5/1997 |
| WO | 0014333 A1 | 3/2000 |
| WO | 2018102704 A1 | 6/2001 |
| WO | 03002343 A1 | 1/2003 |
| WO | 2005044469 A1 | 5/2005 |
| WO | 2006027662 A1 | 3/2006 |
| WO | 2008037764 A1 | 4/2008 |
| WO | 2009032748 A2 | 3/2009 |
| WO | 2009064547 A1 | 5/2009 |
| WO | 2013041469 A1 | 3/2013 |
| WO | 2013086950 A1 | 6/2013 |
| WO | 2015151027 A1 | 10/2015 |
| WO | 2015171443 A1 † | 11/2015 |
| WO | 2016119032 A1 | 8/2016 |
| WO | 2017005553 A1 | 1/2017 |
| WO | 2017005597 A1 | 1/2017 |
| WO | 2018107177 A1 | 6/2018 |
| WO | 2020096418 A1 | 5/2020 |
| WO | 2020170226 A1 | 8/2020 |
| WO | 2021009296 A2 | 1/2021 |
| WO | 2021164913 A1 | 8/2021 |
| WO | 2022165346 A1 | 8/2022 |

OTHER PUBLICATIONS

PCT International Search Report, International Application No. PCT/US2022/014573, issued May 9, 2022, 4 pages.
PCT International Search Report, International Application No. PCT/US2022/014579, issued May 10, 2022, 4 pages.
Fibre Box Association, "Voluntary Standard for Repulping and Recycling Corrugated Fiberboard Treated to Improve Its Performance in the Presence of Water and Water Vapor", 2013, 23 pages.
Third party observations submitted on Mar. 5, 2025 in U.S. Appl. No. 18/273,018, 146 pages.
Bell, "Better by Design", Recycling Today, May 6, 2013, 10 pages.
Chem, "Polyethylene (PE): How to select the right grade"?, Jul. 8, 2025, 16 pages.
EP Application No. 22704711.5, Response to Rule 161 and 162 EPC filed Nov. 13, 2023, 5 pages.
Hanlon et al., "Handbook of Package Engineering", 3rd Edition, Taylor Francis, 1998, abstract and p. 114.
Holik, "Handbook of Paper and Board", Second edition, vol. 1, Wiley-VCH Verlag GmbH & Co. KGaA, 2013, 180 pages.
Kendall Packaging, "Insight Into Cold Seal Applications", Jan. 24, 2019, 9 pages.
Morris, "The Science and Technology of Flexible Packaging—Multilayer Films from Resin nd Process to End Use", Science Direct, 2017, 9 pages.
Printpack, "Cold Seal", 2019, 2 pages.
Soroka, "Fundamentals of Packaging Technology", 2009, front page, table of contents, pp. 338, 346, and 347.
U.S. Appl. No. 63/144,303, filed Feb. 1, 2021, 19 pages.
Fibre Box Association, Voluntary Standard for Repulping and Recycling Corrugated Fiberboard; Revised Aug. 16, 2013; Fibre Box Association (FBA); Elk Groe Village, IL; www.fibrebox.com; 23 Pages.†

* cited by examiner
† cited by third party

BARRIER PAPER PACKAGING FILM

TECHNICAL FIELD

This disclosure is related to paper-based packaging film structures. The structures described herein include barrier materials and are easy to recycle by repulping the paper.

BACKGROUND

The goal of increasing recyclability of paper-based packaging films becomes challenging when adding in the requirements of high barrier, as unmodified paper products do not have high barrier properties on their own. Traditionally, high barrier and sealability is added to paper-based packaging films by way of a multilayer film. The film contains layers specific to delivering the required barrier and sealing. As performance demands increase, the multitude of layers or thickness of the layers in the multilayer film increase, working against the recyclability of the structure as the paper content decreases on a percentage basis.

Often, when high performance is desired from paper-based packaging films, relatively high amounts of additional materials are added to the structure to meet the requirements. Typically, paper-based packaging must have a fiber content of at least 80% by weight in order to be considered recyclable. In order to maintain recyclability of the paper-based packaging film, the paper component thickness and/or weight is increased in order to achieve the paper content required for designating the packaging material recyclable. This additional paper material is problematic in that 1) the addition in itself is wasteful and 2) the additional bulk of the packaging film leads to processing issues on the package forming equipment. The increased thickness and stiffness of the film often leads to slow lines speeds as the film is more difficult to pull through forming collars. The packaging film may also be more difficult to seal because the additional paper weight tends to absorb the heat of the sealing bars and/or prohibit even pressure application. A solution is desired to eliminate these shortcomings.

SUMMARY

Disclosed herein are packaging films having high barrier properties and excellent sealing performance, while maintaining recyclability in a paper recycling process. The packaging films are based on a paper component and include minimal amounts of non-fiber-based materials (i.e., minimal amounts of non-paper materials) to achieve high barrier properties and excellent sealing performance.

Disclosed herein are paper-based packaging films that include a first layer including a fiber-based component, a second layer comprising a polymeric film having a thickness from 2 micron and 8 micron, the polymeric film coated with a barrier material comprising a metal, a metal oxide or an inorganic oxide, a third layer including a sealable polymer, and an adhesive layer located between the first layer and the second layer, the adhesive layer including a water-soluble adhesive. The second layer is located between the first layer and the third layer, the barrier material is located between the polymeric film and the first layer. In some embodiments, the polymeric film of the second layer includes at least one of oriented polyester film, oriented polylactic acid film, polyester, polylactic acid, ethylene vinyl alcohol copolymer and polyvinyl alcohol copolymer. In some embodiments, the total composition of the paper-based packaging film has a fiber content greater than 80%, greater than 85%, greater than 90% or greater than 95%, by weight.

In some embodiments, the water-soluble adhesive is a casein-based adhesive. In some embodiments, the first layer comprises a recycled paper. In some embodiments, the barrier layer is SiOx or AlOx. In some embodiments, the barrier layer comprises SiOx or AlOx. In some embodiments, the barrier layer is a metalized coating. In some embodiments, the barrier layer comprises a metalized coating.

The first layer of the paper-based packaging film may be an outer layer. The third layer of the paper-based packaging film may also be an outer layer. The third layer may be applied directly to the second layer.

In some embodiments of the paper-based packaging film, the third layer is a peelable heat seal lacquer. In some embodiments of the paper-based packaging film, the third layer is a pattern heat seal or cold seal.

Also disclosed herein are hermetically sealed packages including, formed from, or consisting of the paper-based packaging film.

BRIEF DESCRIPTION OF THE DRAWINGS

The disclosure may be more completely understood in consideration of the following detailed description of various embodiments of the disclosure in connection with the accompanying drawings, in which.

Figure 1:
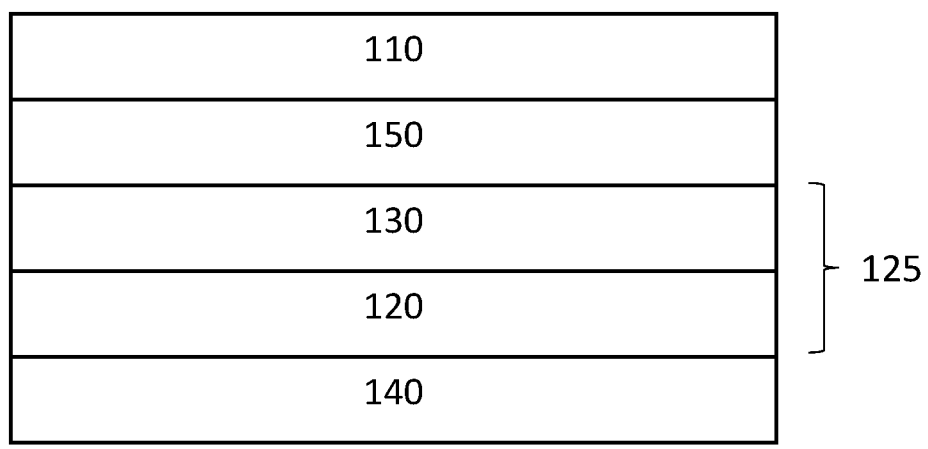
FIG. 1 is a cross-sectional view of a first embodiment of a paper-based packaging film.

The drawings show some but not all embodiments. The elements depicted in the drawings are illustrative and not necessarily to scale, and the same (or similar) reference numbers denote the same (or similar) features throughout the drawings.

DETAILED DESCRIPTION

Provided herein are paper-based packaging films that can overcome the shortcomings of previously provided films. The films are uniquely designed to deliver a critical combination of 1) recyclability (high paper content), 2) ease of package converting, and 3) high barrier. High barrier is achieved by using a thin polymeric film coated with a barrier material. This unique combination of layers and materials allows for an overall high paper content and low thickness, leading to excellent runnability (i.e. high run speed) on packaging equipment.

Also provided herein are hermetically sealed packages including a high paper content paper-based packaging film. The design of the paper-based packaging films allows for hermetic sealing to itself or other packaging components, while retaining a recyclable packaging structure with minimal thickness.

Figure 2:
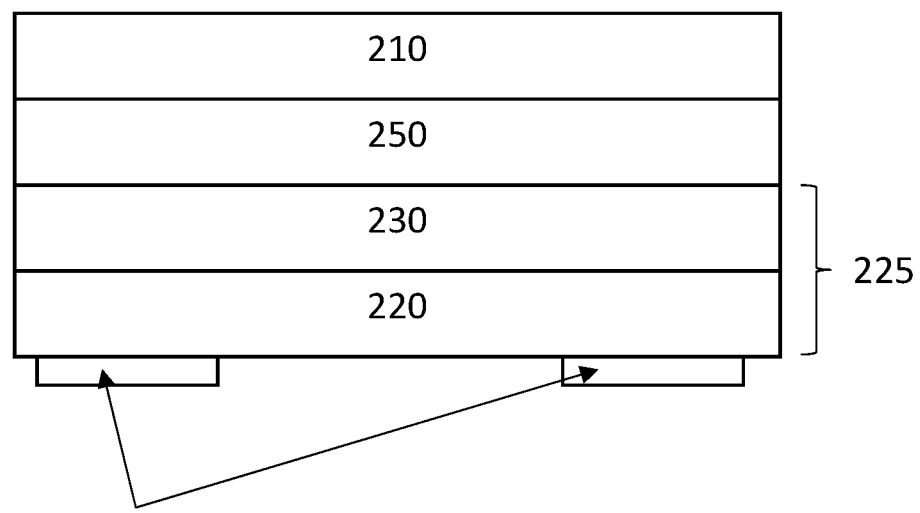
FIG. 2 is a cross-sectional view of a second embodiment of a paper-based packaging film.

Two embodiments of the paper-based packaging films are shown in FIGS. 1 and 2. The paper-based packaging film 100 shown in FIG. 1 includes a first layer 110 connected to a second layer 125 by adhesive layer 150. The second layer 125 includes a polymeric film 120 and a barrier material 130. The barrier material is between the polymeric film and the first layer 110. Further, the packaging film 100 includes a third layer 140, connected to the polymeric film 120 portion of the second layer 125. In this embodiment, the first layer 110 and the third layer 140 are each outer layers. When configured into a package, as will be discussed, the first layer 110 is the exterior surface, exposed to the environment, and the third layer 140 is the interior surface, exposed to the packaged product.

The paper-based packaging film 200 shown in FIG. 2 differs from FIG. 1 in that the third layer 240 is patterned. The paper-based packaging film 200 shown in FIG. 2 includes a first layer 210 connected to a second layer 225 by adhesive layer 250. The second layer 225 includes a polymeric film 220 and a barrier material 230. The barrier material is between the polymeric film and the first layer 210. Further, the packaging film 200 includes a third layer 240, connected to the polymeric film 220 portion of the second layer 225. The third layer 240 is patterned (i.e., a discontinuous layer) and covers only a portion of the surface of the polymeric film 220. In this embodiment, the first layer 210 and the third layer 240 are each outer layers. When configured into a package, as will be discussed, the first layer 210 is the exterior surface, exposed to the environment, and a combination of the polymeric film 220 and the third layer 240 is the interior surface, exposed to the packaged product.

The packaging films described herein include a fiber-based material, a polymeric film, a barrier material, an adhesive and a sealable polymer, each according to details to be revealed here. The paper-based packaging films may include additional layers. The combination of these materials can be described as a multilayer film (e.g., structure, laminate). The term "layer", as used herein, refers to a building block of films. A layer may be a structure of a single material type or a homogeneous blend of materials. A layer may be a single material, a blend of materials within a single material type or a blend of various materials, may contain metallic materials and may have additives. A layer may also have sub-layers or even film layers therein. Layers may be continuous with the film or may be discontinuous or patterned. Both layers and films have a relatively insignificant thickness (z-direction) as compared to the length and width (x-y direction).

All layers and films have two major surfaces, opposite each other, defined by the x-y plane. Reference to "outer layer" as used herein refers to the layers of a film that are on either major surface of the film, i.e., the layers that are not between two other layers of that film. A film has an exterior surface that becomes the exterior of a package in which the film is used. The outer layer that is at the exterior surface is an exterior layer. When formed into a package, the exterior surface and the exterior layer of the film are exposed to the environment. A film has an interior surface that becomes the interior of a package in which the film is used. The outer layer that is at the interior surface is an interior layer. When formed into a package, the interior surface and the interior layer are used for forming seals and is exposed to the packaged product.

The first layer of the paper-based packaging film contains a fiber-based material. As used herein, the term "fiber-based" refers to a paper, including any coatings or additives that may be part of the paper. The first layer may consist of a paper. The first layer is an outer layer of the paper-based packaging film. The paper-component is generally an outer layer of the packaging film that is located at the exterior surface (i.e., the paper-component is the exterior layer). While the paper-component is the outer layer, there may be additional components adjacent to or on the exterior surface of the paper, such as ink or over lacquer. The paper may be any type of paper having a basis weight of 20 g/m$^2$ to 360 g/m$^2$, preferably 30 g/m$^2$ to 100 g/m$^2$, more preferably 30 g/m$^2$ to 70 g/m$^2$. Lower paper component weight is possible, while retaining easy recyclability, because the additional components are minimized. Examples of paper-components that may be useful in the packaging film include, but are not limited to, kraft paper, parchment, impregnated, unbleached and bleached paper. The paper-component may be coated (i.e., clay coated) or uncoated. Examples of paper types that can be used in the paper-based packaging described herein include, but are not limited to, machine glazed bleached kraft paper (MGBK), glassine, one-side clay-coated paper (C1S) and two-side clay-coated paper (C2S).

Conventionally, paper-based materials that are used in flexible packaging do not contain any recycled content, due to the potential migratory chemicals that may be present. If recycled paper content is introduced in a flexible packaging material, it may be coupled with a chemical barrier layer to prevent the migration of these chemicals. Advantageously, some embodiments of the paper-based packaging films described herein may include a first layer containing recycled paper content, a thin film barrier and a sealing layer, thus providing for a previously unavailable combination of properties. These properties include 1) recycled content (recycled paper), 2) food safe (functional barrier included), 3) recyclable structure (>80%, >85%, or >90% fiber content, due to thin film barrier), and 4) hermetically heat sealable (sealing layer). According to the SVI-Guideline a barrier is effective if the breakthrough is below 1% as compared to the starting concentration.

The paper-based packaging films disclosed herein include a second layer that includes a polymeric film. Advantageously, the polymeric film is very thin. The polymeric film may have a thickness greater than 2 micron, greater than 3 micron or greater than 4 micron. The polymeric film may have a thickness less than 8 micron, less than 7 micron or less than 6 micron. For example, the polymeric film may have a thickness from 2 micron to 8 micron, or from 2 micron to 6 micron. Preferably, the polymeric film has a thickness from 4 micron to 8 micron.

The polymeric film preferably contains one or more of a polyester, a polylactic acid (PLA), a polyamide, an ethylene vinyl alcohol copolymer or a polyvinyl alcohol copolymer. The polymeric film may be an oriented film such as, but not limited to, biaxially oriented polyester (BOPET), biaxially oriented polyamide (BOPA) or oriented polylactic acid (OPLA). The polymeric film may be monolayer or multilayer. The polymeric film may be an unoriented material such as, but not limited to, unoriented PLA. The polymeric film may be biaxially oriented or monoaxially oriented.

The polymeric film of the second layer is coated with a barrier material. The barrier material may be coated directly onto the polymeric film, or there may be a primer layer between the barrier material and the polymeric film. The barrier material is located between the polymeric film and the first layer. The barrier material may provide reduced transmission of oxygen, moisture or both oxygen and moisture. The barrier layer may be protected by an additional layer providing a more robust structure when further processed into a paper-film laminate. Topcoats chosen must have good adhesion to the barrier material surface and the adhesive used.

The polymeric film and the barrier material of the paper-based packaging film are each coextensive with the paper component. The barrier material may be a metal, such as a thin deposition of aluminum. The barrier material may be a transparent metal oxide coating or inorganic oxide coating such as aluminum oxide (AlOx) or silicon oxide (SiOx). The barrier material may be multi-layer and contain different layers of barrier materials. The barrier material may include a polymeric material, such as polyamide, ethylene vinyl alcohol copolymer or polyvinyl alcohol copolymer. The barrier material may be a blend of multiple barrier materials.

Combinations of polymeric film and barrier material that have been produced and found useful by the inventors include SiOx coated OPET, SiOx coated BOPP, AlOx coated OPET, AlOx coated BOPP, aluminum metal coated OPET and aluminum metal coated BOPP. In the examples and data section below, an overview can be found of different examples and the barrier properties observed for oxygen and moisture.

In some embodiments, the paper-based packaging film containing a barrier material coated on a polymeric film has an average oxygen transmission rate (OTR) value that is less than 5 $cm^3/m^2/day$, less than 1 $cm^3/m^2/day$ or less than 0.5 $cm^3/m^2/day$ measured according to ASTM F1927 using conditions of 1 atmosphere, 23° C. and 50% RH. In some embodiments, the paper-based packaging film containing a barrier material coated on a polymeric film has an average moisture vapor transmission rate (MVTR) value that is less than 1 $g/m^2/day$ or less than 0.3 $g/m^2/day$ measured according to ASTM F1249 using conditions of 1 atmosphere, 38° C. and 90% RH.

The paper-based packaging films include an adhesive layer bonding the first layer to the second layer. The adhesive layer may be in direct contact with the paper of the first layer. The adhesive layer may be in direct contact with the barrier material of the second layer. The adhesive may be applied by any known means of web-to-web lamination, such as dry bond lamination, wet bond lamination or heat lamination. The adhesive may have a dry basis weight (i.e., after solvent removal) of between 0.5 $g/m^2$ and 4 $g/m^2$ preferably between 0.9 $g/m^2$ and 1.7 $g/m^2$.

As used herein, the term "basis weight" is used to refer to the amount of material by weight is in a given generalized area of a film or layer. Typically, the area defined is a square meter but any area can be used. The area is defined in the length-width (i.e., x-y direction) of the film or layer. A material of a given thickness (z-direction) and density, has a specific weight if it were covering a defined area (i.e., a square meter). This is the basis weight. Basis weight is used for paper because the density of paper can vary widely meaning that defining paper by thickness can be difficult. Materials that are applied in discontinuous layers, such as the patterned sealable material, can be defined by basis weight. In the case of patterns, the basis weight refers to the amount of material applied as if it covered the defined area. The use of basis weight to define materials such as paper and patterned materials is common in the film converting industry.

The adhesive layer contains an adhesive that is water soluble. As used herein, the term "water soluble" means that upon prolonged exposure to or immersion in liquid water, the adhesive loses its adhesive and/or cohesive properties, thus enabling the delamination (i.e., separation) of the paper component from the rest of the packaging film structure during a repulping process. Examples of materials that may be used within an adhesive layer between the paper-component and the barrier layer include, but are not limited to, casein-based adhesives (i.e. latex/casein blends), starch, sugar derivatives, cellulose, amino resin, (poly)acrylate, polyvinyl alcohol (PVOH), polyvinyl acetate, polyacrylic acid, maleic acid-modified ethylene copolymers, methylcellulose, carboxy-methylcellulose, carboxy-functional polyesters, polyethylene succinate, polybutylene succinate, ionomers or hydrophilic polyurethane.

The paper-based packaging films also include a third layer as an outer layer at the interior surface. The third layer contains a sealable polymer. The third layer may be continuous with the first layer or it may be patterned. As used herein, the term "patterned" means that the layer is discontinuous with the packaging film. If patterned, the sealable material is generally applied to only the areas of the packaging film that are involved with closing the package by sealing. The sealable material may be applied over more than 5%, more than 10% or more than 15% of the surface of the polymeric film. The sealable material may be applied over less than 30%, less than 25% or less than 20% of the polymeric film. As a result, if the sealable material is patterned, the interior surface of the paper-based packaging film is partially the polymeric film surface and partially the sealable material. For example, the interior surface of the paper-based film may be approximately 80% polymeric film and 20% sealable material. The interior surface may consist of only the sealable material or a combination of the polymeric film and the sealable material.

The sealable material of the paper-based packaging film may have a composition that will allow the formation of a heat seal, thus forming a hermetic package. As used herein, the term "heat seal", "heat sealable" or "heat sealed" refers to two or more surfaces that have been or can be bonded together by application of both heat and pressure. Heat sealing is a well-known and commonly used process for creating packages and is familiar to those skilled in the art. During heat sealing, the sealing layer softens due to the application of heat, allowing formation of a heat seal bond. Since the heat must be driven through the entire packaging film to raise the temperature of the sealable material, and the paper component often absorbs much of the heat, it is advantageous if the heat sealable material softens and seals at a relatively low temperature. Lower seal initiation temperature (SIT) enables faster packaging line speeds. For example, some embodiments of the paper-based packaging film may include a heat sealable material that exhibits an SIT of less than 110° C., less than 100° C. or less than 90° C. Possible heat sealable materials may be based on, but are not limited to, acrylate copolymers, PET, PE, PP or hot melts (wax based).

The sealable material may alternatively be a pressure sensitive cold seal. This embodiment of the paper-based packaging film is advantageous as formation of the package does not require heat. This may be advantageous for the packaging of heat sensitive products such as ice cream or chocolates. Embodiments of the paper-based packaging film may include a pressure sensitive cold seal systems based on, but not limited to, natural or synthetic polyisoprene latex, or styrene-butadiene copolymer latex. The cold seal material may be blends that include acrylates and/or tackifiers.

In some embodiments, the sealable material is one that creates peelable seals. As used herein, "peelable seals" are those that can be opened manually without significant damage to the integrity of the packaging film. The sealable material may be a cold seal that can be peeled open or it may be a heat seal that can be peeled open. A sealable material may be a peelable heat seal lacquer.

The sealable material may be applied at a thickness that allows for hermetic sealing. The sealable material may be applied at a basis weight of greater than 2 $g/m^2$ or greater than 3 $g/m^2$. The sealable material may be applied at a basis weight of less than 8 $g/m^2$, less than 9 $g/m^2$ or less than 10 $g/m^2$. For example, the sealable material may have a basis weight of between 3 $g/m^2$ and 9 $g/m^2$.

In some embodiments the third layer may have a thickness from about 10 microns to about 50 microns.

In other embodiments the third layer may be a thin layer incorporated into an oriented film. For example, the paper-based packaging film may contain a BOPP film coated with a SiOx coating. The BOPP film may be multilayer, at least one of the layers serving as the polymeric film of the second layer, and at least one different layer having sealing properties and serving as the third layer.

As described herein, the "total composition" of the paper-based packaging film refers to all materials encompassed therein. The total composition of the paper-based packaging film should include a fiber content greater than 80%, greater than 85%, greater than 90% or greater than 95%, by weight. The total composition of the paper-based packaging film should include a fiber content less than 99%, less than 98%, less than 97% or less than 96%, by weight. For example, the paper component of the paper-based packaging film may be between 85% and 98%, by weight of the total composition.

The thickness of the paper-based packaging film ranges from 30 to 200 μm.

When a pressure sensitive cold seal material is used as the sealable material, a release lacquer may be added to the exterior surface of the paper component (i.e. the exterior surface of the paper-based packaging film). The lacquer prevents the cold seal material from sticking to the paper component when the film is in roll format. The release lacquer typically consists of a polyamide matrix with some wax additives. A water-based release lacquer is advantageous for the release of coatings and inks from the non-seal side of the structure.

The paper-based packaging film may also include ink located on the exterior surface of the paper-based packaging film. The type of ink and amount of ink can be varied within ranges agreeable with local paper recycling guidelines.

Figure 3:
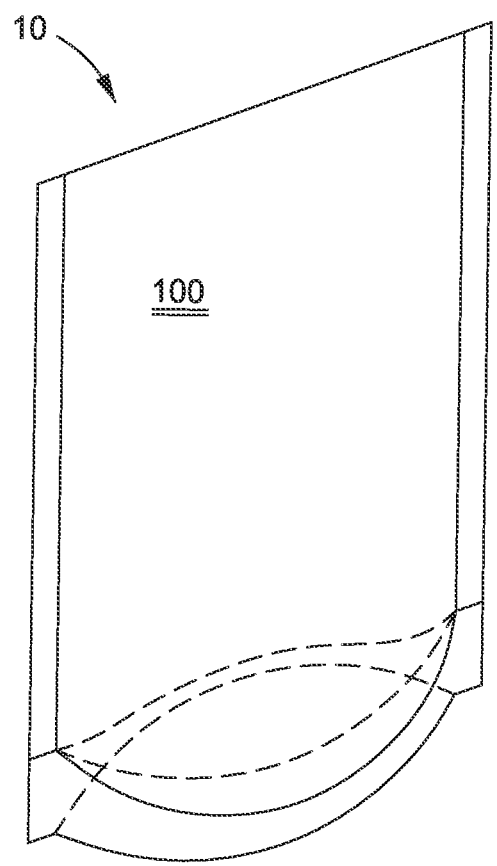
FIGS. 3 and 4 are perspective views of embodiments of hermetically sealed packages.
Figure 4:
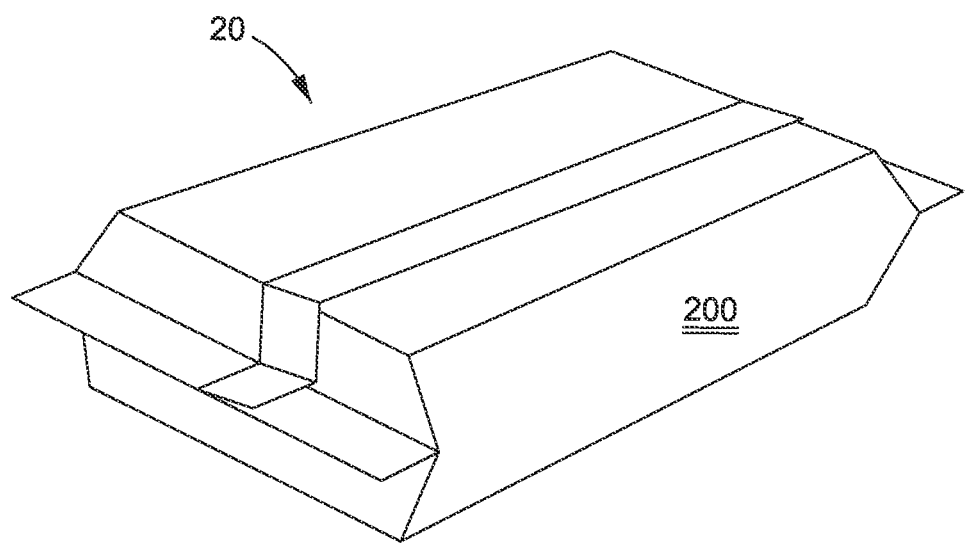

The paper-based packaging film may be used to produce sealed packages, such as those shown in FIGS. 3 and 4. FIG. 3 shows a package 10 in the configuration of a stand-up pouch that includes a bottom gusset. The package 10 is formed entirely from a paper-based packaging film 100. FIG. 4 shows a package 20 in the configuration of a flow wrap package. The package 10 is formed entirely from a paper-based packaging film 200. Other package styles include, but are not limited to, sachets or pouches. Other multicomponent packaging configurations such as cup and lid configurations, where the lid is the paper laminate and the cup is another material, may also benefit from the paper-based packaging films disclosed herein.

EXAMPLES & DATA

Inventive Example 1A, 1B, 1C, 1D and 1E are laminates that were used as horizontal flow wrap material and tested as described below. Barrier results can be found in Table 1.

Inventive Example 1A was produced by laminating a 67 g/m² uncoated bleached kraft paper to an aluminum metalized 8 micron BOPP film. A latex/casein blend adhesive was applied to the metalized side of the BOPP film at a weight of 1.5 g/m² for the lamination, using a wet bond lamination process. The metalized side of the BOPP film was laminated facing the paper. A natural latex rubber cold seal material was pattern coated onto the unmetallized side of the BOPP film side of the laminate. The cold seal was applied at approximately 5 g/m² in a pattern like that shown in FIG. 3. The cold seal covered approximately 20% of the surface of the BOPP film. A release lacquer was applied to the exterior surface of the paper at approximately 1.8 g/m².

Inventive Example 1B was produced in a similar way as Inventive Example 1A but a 50 g/m² paper was used to replace the 67 g/m² paper.

Inventive Example 1C was produced in a similar way as Inventive Example 1A but a SiOx coated 8 micron OPET film was used to replace the metalized BOPP film. The SiOx coated side of the OPET film was laminated facing the paper and the cold seal material was pattern coated onto the OPET side of the laminate.

Inventive Example 1 D was produced by laminating a 50 g/m² uncoated bleached kraft paper to a SiOx coated 4.5 micron OPET film. A latex/casein blend adhesive was applied at a weight of 1.5 g/m² for the lamination, using a wet bond lamination process. The SiOx coated side of the OPET film was laminated facing the paper. A heat sealable solvent based polyester material was pattern coated onto the OPET film side of the laminate. The polyester was applied at approximately 3.5 g/m² in a pattern like that shown in FIG. 3. The heat seal covered approximately 20% of the surface of the OPET film.

Inventive Example 1E was produced in a similar way as Inventive Example 2A but the heat seal was increased to a coating weight of approximately 9 g/m².

TABLE 1

Overview of Inventive examples and the barrier properties observed

| Example | Structure | Paper content* | WVTR at 38° C./ 90% rH (g/m²*24 h) | OTR at 23° C./ 50% rH (cc/m²*24 h) |
|---|---|---|---|---|
| Inventive Example 1A | Release lacquer (1.8 g/m²)//Print//Paper (67 g/m²)//Adhesive//Alu//BOPP(8 μm)//Cold seal (5 g/m²) | 84% | <0.5 | <50 |
| Inventive Example 1B | Release lacquer (1.8 g/m²)//Print//Paper (50 g/m²)//Adhesive//Alu//BOPP(8 μm)//Cold seal (5 g/m²) | 80% | <0.5 | <50 |
| Inventive Example 1C | Release lacquer (1.8 g/m²)//Print//Paper (67 g/m²)//Adhesive//SiOx//OPET(8 μm)//Cold seal (5 g/m²) | 80% | <1.5 | <0.5 |
| Inventive Example 1D | Paper (50 g/m²)//Adhesive//SiOx//OPET(4.5 micron)//Heat seal (3.5 g/m²) | 85% | <1.5 | <0.5 |
| Inventive Example 1E | Paper (50 g/m²)//Adhesive//SiOx//OPET(4.5 micron)//Heat seal (9.0 g/m²) | 84% | <1.5 | <0.5 |

Besides barrier to oxygen and moisture also barrier to mineral oils is provided by the use of thin films that have are composed of a polymer containing polar groups such as OPET. Inventive Example 2A was produced by laminating a 50 g/m² uncoated bleached kraft paper to an aluminum metalized 4.5 micron BOPP film. A solvent based adhesive was applied to the metalized side of the PET film at a weight of 2.5 g/m² for the lamination, using a wet bond lamination process. The metalized side of the BOPP film was laminated facing the paper. Looking at Table 2 it shows that barrier against both types of chemicals present in mineral oils are effectively blocked by the film, although some breakthrough of Heptadecan is detected.

TABLE 2 migration test using a donor (spike cardboard) and Tenax as acceptor at 60° C. for 10 days. Increase in concentration was measured using GC/MS. Lower than 1% indicated the barrier is sufficient for that type of chemical.

| Reference | Structure | C17 | MPB | DPP | Anthracene | Perylene |
|---|---|---|---|---|---|---|
| Inventive example 2A | Paper (50 g/m²)// Adhesive// metPET (4.5 µm) | 3.5% | 0.7% | 0.6% | 0.6% | 0.0% |

Heptadecan (C17) MOSH-marker,
methylbenzophenon (MBP),
dipropyphthalate (DPP),
Anthracene and Perylene (MOAH markers)

The invention claimed is:

1. A paper-based packaging film comprising:
a first layer comprising a fiber-based component comprising a basis weight of 20 g/m² to 100 g/m²,
a second layer comprising a polymeric film comprising a thickness from 2 micron to 8 micron, the polymeric film coated with a barrier material comprising a metal, a metal oxide or an inorganic oxide,
a third layer comprising a sealable polymer, and
an adhesive layer located between the first layer and the second layer, the adhesive layer comprising a water-soluble adhesive,
wherein the second layer is located between the first layer and the third layer,
the third layer is applied directly to the second layer,
the barrier material is located between the polymeric film and the first layer,
the polymeric film of the second layer comprises at least one of oriented polyester film, oriented polylactic acid film, polyester, polylactic acid, ethylene vinyl alcohol copolymer and polyvinyl alcohol copolymer,
the fiber-based component is an outer layer, and
the total composition of the paper-based packaging film comprises a fiber content greater than 80%, by weight.

2. The paper-based packaging film according to claim 1 wherein the water-soluble adhesive is a casein-based adhesive.

3. The paper-based packaging film according to claim 1 the first layer comprises a recycled paper.

4. The paper-based packaging film according claim 1 wherein the barrier layer comprises SiOx or AlOx.

5. The paper-based packaging film according to claim 1 wherein the barrier layer comprises a metalized coating.

6. The paper-based packaging film according to claim 1 wherein the third layer is an outer layer.

7. The paper-based packaging film according to claim 1 wherein the third layer is a peelable heat seal lacquer.

8. The paper-based packaging film according to claim 1 wherein the third layer is a patterned heat seal or cold seal material.

9. A hermetically sealed package comprising the paper-based packaging film according to claim 1, wherein the fiber-based component is located at an exterior surface of the paper-based packaging film.

10. The hermetically sealed package according to claim 9 wherein the package consists of the paper-based packaging film.

* * * * *